(12) United States Patent
Crisman et al.

(10) Patent No.: US 9,202,218 B1
(45) Date of Patent: Dec. 1, 2015

(54) PROCESSING ELECTRONIC MAIL REPLIES

(75) Inventors: Zachary Crisman, Seattle, WA (US); Dennis Crisman, legal representative, Seattle, WA (US); Siddharth Vivek Joshi, Seattle, WA (US); Jamie J. Sheehan, Cork (IE); Charles E. Dannaker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 369 days.

(21) Appl. No.: 13/431,341

(22) Filed: Mar. 27, 2012

(51) Int. Cl.
G06Q 30/00 (2012.01)
G06Q 30/02 (2012.01)
H04L 12/58 (2006.01)
H04L 9/32 (2006.01)

(52) U.S. Cl.
CPC ............ *G06Q 30/00* (2013.01); *G06Q 30/0281* (2013.01); *H04L 9/3228* (2013.01); *H04L 51/28* (2013.01); *G06Q 30/016* (2013.01)

(58) Field of Classification Search
CPC ....... H04L 12/58; H04L 51/00; H04L 9/3212; H04L 51/28; H04L 9/3228; G06Q 30/00; G06Q 30/016; G06Q 10/06; G06Q 10/107; G06Q 20/20; G06Q 30/02; G06Q 30/0281
USPC .......... 709/204, 206, 209; 715/752; 705/7.27, 705/16
See application file for complete search history.

(56) References Cited

U.S. PATENT DOCUMENTS

| | | | |
|---|---|---|---|
| 7,587,678 B1* | 9/2009 | English et al. | 715/752 |
| 2004/0073621 A1* | 4/2004 | Sampson | 709/209 |
| 2004/0215721 A1* | 10/2004 | Szeto et al. | 709/204 |
| 2005/0091318 A1* | 4/2005 | Keohane et al. | 709/206 |
| 2010/0222038 A1* | 9/2010 | Dragt | 455/414.1 |
| 2012/0290666 A1* | 11/2012 | Fabre et al. | 709/206 |
| 2013/0090976 A1* | 4/2013 | White et al. | 705/7.27 |
| 2013/0198018 A1* | 8/2013 | Baig | 705/16 |

OTHER PUBLICATIONS rfc4021.pdf IETF RFC 4021 by Klyne et al in Mar. 2005.*
IETF RFC-4021, Mar. 2005.*
IETF RFC-2822, Apr. 2001.*
"Send Replies to Another Address in Outlook 2007" online article dated Nov. 2, 2007.*
Email from LLBean Order Processing.pdf.*

* cited by examiner

*Primary Examiner* — Wing F Chan
*Assistant Examiner* — Raji Krishnan
(74) *Attorney, Agent, or Firm* — Thomas | Horstemeyer, LLP

(57) ABSTRACT

Disclosed are various embodiments for processing email and/or reply emails. A contact entry associated with a user issue is created. The contact entry is associated with an issue category based upon a context of the contact entry. A unique email token associated with the contact entry is generated. Emails sent to the user are generated with a reply-to address that incorporates the email token.

17 Claims, 6 Drawing Sheets

```
Date: Tue, 29 Mar 2005 15:11:45 -0800 (PST)
From: Customer Service (service@shop.site)
Subject: Your question about Order #53092AX
To: Mr Smith (MrSmith@email.site)

Mr. Smith:
Thanks for e-mailing shop.site and for your question.  We have
issued you a refund for the Brown Widget that you purchased.
Please feel free to contact us by replying to this email if you
have any additional questions.
```

FIG. 2A  173

```
Delivered-To: MrSmith@email.site
Received: by 10.0.0.1 with SMTP1 id e3cs239nzb; Tue, 29 Mar 2005
15:11:47 -0800 (PST)
Return-Path:
Received: from mail.email.site (mail.site.site [111.111.11.111])
by mx.shop.site with SMTP id h19si826631rnb.2005.03.29.15.11.46;
Tue, 29 Mar 2005 15:11:47 -0800 (PST)
Message-ID: <20050329231145.62086.mail@email.site>
Received: from [11.11.111.111] by mail.email.site via HTTP; Tue,
29 Mar 2005 15:11:45 PST
Date: Tue, 29 Mar 2005 15:11:45 -0800 (PST)
From: Customer Service (service@shop.site)
Reply-To: [service+A34CD99@shop.site] — 203
Subject: Your question about Order #53092AX
To: Mr Smith (MrSmith@email.site)

Mr. Smith:
Thanks for e-mailing shop.site and for your question.  We have
issued you a refund for the Brown Widget that you purchased.
Please feel free to contact us by replying to this email if you
have any additional questions.
```

FIG. 2B  173

PROCESSING ELECTRONIC MAIL REPLIES

BACKGROUND

Customers of an enterprise, such as an electronic commerce site, product manufacturer, customer call center, or any other type of environment in which customers initiate contact to resolve issues, may communicate with the enterprise customer service department or personnel via email. Exposing email addresses to the public creates a risk of large volumes of unauthorized or spam emails being sent to the exposed email addresses, which may require human intervention and/or analysis to determine whether the email was sent by an actual customer such that resolution of the customer issue is required. This can create potential wasted resources and/or time of enterprise personnel in the processing and/or analysis of these unauthorized emails that may be better spent on resolving customer issues.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A-2B are drawings of an example email generating by the email processing application executed by the computing device of FIG. 1 according to various embodiments of the present disclosure.

DETAILED DESCRIPTION

The present disclosure relates to systems and methods that can reduce unauthorized electronic mail (email) that is received by a mail server and/or group of mail servers associated with an enterprise that may receive inquiries from customers and generate email responses that are sent to customers. Embodiments of the disclosure provide a framework that also allows for tracking, routing and/or escalation of inquiries from customers. Emails are often generated by an enterprise and sent to email addresses associated with a customer account. These emails are related to issues and/or inquiries initiated by a customer and are often sent with a "reply-to" and/or "from" email address that is a customer service email address. By exposing a customer service email address in this way, the enterprise may be subjected to a large volume of unauthorized, unsolicited, and/or "spam" email message that are sent to this customer service email address, particularly in the case of a high profile or large enterprise that may serve millions of customers.

Employing a blanket restriction or rejection of emails sent to such a customer service email address may prevent customers of the enterprise from continuing contact with customer service personnel regarding the customer's initial inquiry or issue. Accordingly, embodiments of the disclosure provide the ability to generate customer specific or issue specific email addresses that a customer can use to correspond with personnel of an enterprise while also providing the ability to reject unauthorized messages received at such an email address, thereby reducing the amount of email messages that require human intervention or analysis. Additionally, embodiments of the disclosure can also facilitate post processing of a customer email, issue tracking, and escalation of issues based upon email received from a customer from at such an address. In the following discussion, a general description of the system and its components is provided, followed by a discussion of the operation of the same.

Figure 1:
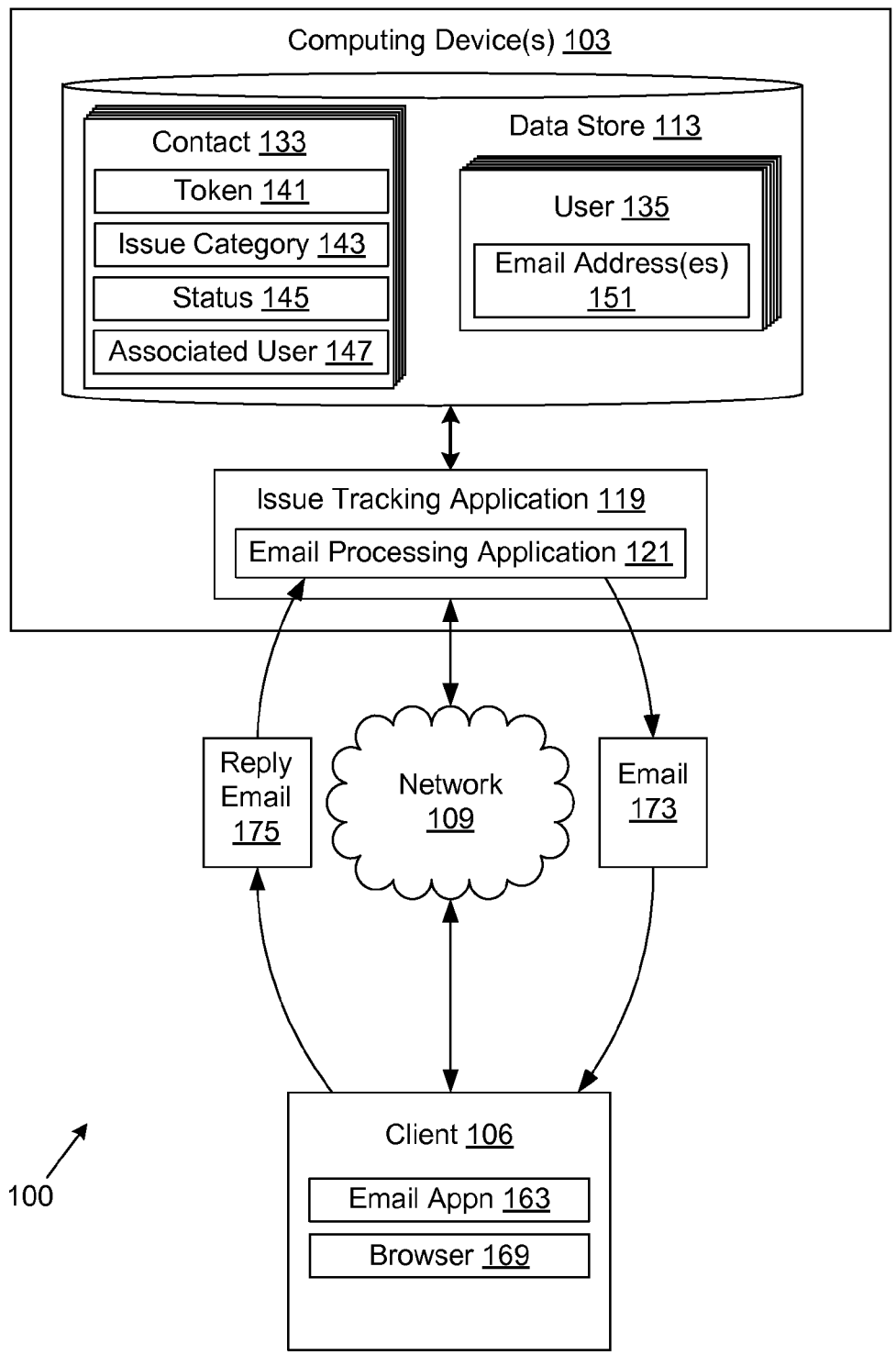
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

The components executed on the computing device 103, for example, include an issue tracking application 119 that includes an email processing application 121, and other applications, services, processes, systems, engines, or functionality not discussed in detail herein. The issue tracking application 119 is executed to facilitate management of issues that are reported by and/or associated with users, such as customers of an electronic commerce system. In other words, the issue tracking application 119 can represent an application that manages customer service issues for an entity. For example, the issue tracking application 119 can represent a customer relationship management (CRM) application or suite of applications that allows personnel to create and/or manage data associated with customer service issues in an enterprise. These issues can include trouble tickets, requests for service (e.g., maintenance, repair), refund requests, complaints, or any other type of data associated with a customer in a customer service context. Therefore, the issue tracking application 119 can facilitate categorization of issues reported by users, routing and/or escalation of issues to appropriate personnel or teams of personnel, reporting of aggregate customer service data related to these issues, and other functionality that can be provided in such a context that is not discussed in further detail herein, as it is unnecessary for a full understanding of the embodiments of the disclosure.

The email processing application 121 is executed to facilitate generating email addresses that are customer specific and/or issue specific that a customer and enterprise personnel can use to correspond regarding an inquiry and/or issue initiated by a customer. In response to creation of an issue or a user initiated contact with an enterprise, the email processing application 121 can create an email address token that can be used as a part of the "local-part" or username portion of an email address. In other words, the email processing application 121 can create a tokenized email address. As described herein, this tokenized email address can then be used for subsequent correspondence with the customer regarding the issue or user initiated contact. Additionally, the email processing application 121 can also monitor incoming email to one or more email systems associated with the enterprise and either reject unauthorized email or appropriately route authorized email that is received at the tokenized email address.

The data stored in the data store 113 includes, for example, contacts 133. In the context of this disclosure, a contact 133 represents a customer initiated contact with an enterprise, such as an electronic commerce site, regarding an issue. For example, as noted above, such an issue can include a request for a refund for a product, a request for product repair service, or any other customer service requests as can be appreciated. As another example, a contact 133 can also be created by enterprise personnel without initiation of contact with a customer service department. For example, one or more users may encounter issues interacting with a site operated by the enterprise. Accordingly, enterprise personnel can create a contact 133 associated with the one or more users who experienced such an issue and proactively contact the users via email to offer a concession and/or information regarding the issue. Each contact 133 is associated with a token 141. A token 141 represents any alphanumeric identifier that is generated by the email processing application 121 that can be at least a portion of a tokenized email address that can used on a customer specific and/or contact 133 specific basis. A token 141 is also uniquely associated with a contact 133 within the data store 113. In this sense, a token 141 is unique in the sense that no other token 141 that is associated with an active contact 133 can have the same alphanumeric identifier. In some embodiments, the token 141 can be an identifier by which contacts 133 are indexed in the data store 113.

A contact 133 can also be associated with one or more issue categories 143 that specify one or more categories or types corresponding to the subject matter of a customer initiated contact 133. For example, if a customer initiates contact with an enterprise seeking product repair service for a product purchase from an electronic commerce site, the contact 133 can be categorized as such and assigned by the issue tracking application 119 to the appropriate personnel and/or team of personnel to provide the appropriate customer assistance. As another example, a customer seeking a refund may cause the contact 133 to be categorized as such so that the issue tracking application 119 can assign the contact 133 to personnel who can determine whether a refund is appropriate and provide the refund to the customer.

Each contact 133 is also associated with a status 145 indicator, which specifies whether the token 141 associated with a contact 133 is activated or deactivated. In this sense, an activated token 141 corresponds to a tokenized email address at which the email processing application 121 accepts email sent from users and/or customers. A deactivated token 141 corresponds to a tokenized email address at which the email processing application 121 rejects received emails. In some embodiments, the status 145 indicator can also be associated with whether the issue related to the contact 133 is resolved or unresolved. In this scenario, an unresolved status indicator corresponds to a contact 133 associated with an issue that personnel associated with the enterprise are still working to resolve. In other words, an unresolved status can also correspond to an open trouble ticket. A resolved status indicator corresponds to an issue that personnel associated with the enterprise have resolved and have communicated the resolution to a customer associated with the contact 133. In other words, a resolved status indicator corresponds to a closed trouble ticket.

Each contact 133 is also associated with an indicator that identifies an associated user 147 with which the contact 133 corresponds. In other words, the associated user 147 of a contact 133 represents the customer who initiated contact with an enterprise. The associated user 147 indication can be an account number, user identifier, or any other identifier with which account information of the user can be identified. In some cases, a contact 133 can be associated with more than one user.

Each customer of the enterprise is associated with a user 135 entry in the data store 113. A user 135 can be associated with various customer account information such as, for example, contact information, order histories, shipping addresses, mailing addresses, and/or other information that can be associated with a customer account as can be appreciated but which is not discussed in further detail herein. Additionally, each user 135 is also associated with one or more email addresses 151. An email address 151 of a user 135 is one that the enterprise can contact a customer regarding customer service issues. Additionally, an email address 151 can also be associated with the user 135 as a part of a contact form or provided by the user during a phone call initiated by the user to a customer service department of an enterprise.

The depicted table structure of the data store 113 is one example of how data can be structured therein according to embodiments of this disclosure, as it should be appreciated that data can be structured in many different ways across multiple data stores implemented in various computing devices. Data can be extracted by the issue tracking application 119 and/or email processing application 121 by performing queries against data stored in the data store in wholly different table structures. In various embodiments, the data store 113 may comprise a relational or non-relational database, or any other type of system from which data can be retrieved. Accordingly, it should be appreciated that the depicted data store 113 and the table structure shown therein is but one example given for ease of depiction and explanation of the various embodiments of this disclosure. Additionally, the data store 113 may be provided in a first computing device 103 (or cluster of computing devices) and the issue tracking application 119 and/or email processing application 121 in a second and/or third computing device 103 (or clusters of computing devices) that communicate over a network 109. It should be appreciated that the particular illustration shown in the FIG. 1 is shown for ease of depiction.

Likewise, it should also be appreciated that the particular depiction of an issue tracking application 119 and email processing application 121 executed in one or more computing devices 103 is but one example of an environment in which an embodiment of the disclosure can be implemented. It should be appreciated that an implementation according to an embodiment of the disclosure can be implemented in various ways, with the functionality described herein implemented in various application structures.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, tablet computer systems, game consoles, or other devices with like capability.

The client 106 may be configured to execute various applications such as an email application 163, a browser 169, and/or other applications. The email application 163 is executed in the client 106 to facilitate communication with others via email. The browser 169 may be executed in a client 106, for example, to access and render network pages, such as web pages, or other network content served up by the computing device 103 and/or other servers. Additionally, a user may interact with a site providing email services via the browser 169 to communicate with others via email. The client 106 may be configured to execute applications beyond the email application 163 or the browser 169 such as, for example, instant message applications, word processing applications, spreadsheet application, drawing applications, and/or other applications.

Next, a general description of the operation of the various components of the networked environment 100 is provided. According to one embodiment, a user 135 or customer initiates contact with an enterprise, such as with a customer service department of the enterprise. The customer may be seeking customer service or resolution of some issue related to a purchase or other type of interaction with the enterprise. The customer can initiate contact with the enterprise via phone, emailing a customer service email address, completing a web based contact form, or other form of communication. In response, personnel of the enterprise can, via the issue tracking application 119, create a contact 133 in the data store 113 corresponding the customer initiated contact. The contact 133 can also include additional information about the issue to facilitate resolution by enterprise personnel. Based upon the subject matter of the customer initiated contact, the issue tracking application 119 specifies an issue category 143 associated with the contact 133.

The issue category 143 can be selected by a user initiated contact with the enterprise (e.g., via a web-based contact form), or by personnel of the enterprise (e.g., upon receiving a phone call initiated by the customer). Based upon the selected issue category 143, the issue tracking application 119 can route the contact 133 to the appropriate personnel and/or team of personnel. For example, certain issue categories 143, such as a customer requested return or refund, may be best resolved by a specialized refund and return processing team. Therefore, the issue tracking application 119 can route the contact 133 to the appropriate team in such a scenario. Upon creation of a contact 133 corresponding to a customer initiated contact, the email processing application 121 can create a token 141 corresponding to the contact 133. As noted above, the token 141 represents a unique identifier that can be used as at least a portion of a unique email address with which the user associated with the contact 133 can correspond regarding the customer service issue that prompted creation of the contact 133. In some embodiments, the email processing application 121 generate a token 141 with a hash function and/or other function that generates a random identifier such that the token 141 itself does not reveal any information about the contact 133. Upon creation of the token 141, the email processing application 141 can designate the status 145 indicator associated with the contact 133 and/or token 141 as deactivated until an email is sent to a customer and/or user associated with the contact 133 by the enterprise.

In some embodiments, as an alternative example, upon resolution of the issue corresponding to the contact 133 by personnel of an enterprise, the issue tracking application 119 and/or email processing application 121 can designate the status 145 of the contact 133 as "resolved," "closed," or any other appropriate status indicator that indicates that the issue associated with the contact 133 has been resolved. In any embodiment, the status 145 indicator can be used by the email processing application 121 to indicate whether emails sent to a tokenized email address should be accepted or rejected.

Thereafter, the email processing application 121 can send an email to one or more email addresses associated with the customer's user 135 account, where the email that provides information regarding resolution of the issue. The email processing application 121 can also generate a tokenized email address that incorporates the token 141 corresponding to the contact 133. The tokenized email address can include the token 141 as a part of the local-part and/or domain name of the email address. In one embodiment, the token 141 can be appended to a user name and the resultant string used as the local-part of the email address. As should be appreciated by a person of ordinary skill in the art, the local-part of an email address is the portion of the email address that generally appears before the "@" symbol that is used in an email address. For example, in one embodiment, the local-part of the email address can follow a format as follows:

username+token@domain

In the above non-limiting example, the username can be, for example, a user friendly string that provides an indication to a user of the destination address to which the email address corresponds. For example, in the case of an email address corresponding to a customer service department, an example user friendly username is "cs-email." The token 141 in the above illustration can be any alphanumeric identifier that is unique within the universe of contacts 133 in the data store 113.

Accordingly, upon generating the tokenized email address, the email address is then used as a "from" address and/or a "reply-to" address of an email 173 that is generated and sent to the user 135 email address 151 regarding resolution of the customer's issue. Thereafter, when the user creates a reply email 175 to the email 173 via an email application 163 and/or cloud based email site in a browser 169, the reply email 175 is created with a "to" address as the tokenized email address. Upon obtaining the reply email 175 sent to the tokenized email address, the email processing application 121 can identify the token 141 in the "to" address of the reply email 175, where the "to" address is the tokenized email address.

The email processing application 121 can then identify the contact 133 in the data store 113 to which the reply email 175 corresponds based upon the token 141 extracted from the reply email 175. The email processing application 121 can then perform post processing operations that can be associated with the issue category 143 corresponding to the contact 133 entry. For example, the email processing application 121 can initiate escalation procedures if a reply email 175 is received that corresponds to a contact 133 entry by forwarding the reply email 175 to appropriate personnel that are associated with the issue category 143. As another example, the email processing application 121 can forward the reply email 175 to the very same person who issued the email 173 containing the issue resolution information to the customer.

Additionally, the email processing application 121 can perform filtering based upon the extracted token 141 from the "to" address from the reply email 175 header. For example, the email processing application 121 can identify the sender of the reply email 175 by identifying a "from" address in the reply email 175 header. If the sender of the reply email 175 is not an email address 151 corresponding to the associated user 147 of the reply email 175, the email processing application 121 can generate and send a rejection email to the sender of the reply email 175. Additionally, the token 141 associated with the email 173 can be associated with an expiry window, or a predetermined and/or configurable threshold of time from the sending of the email 173 after which a reply email 175 sent to the tokenized email address are rejected. If a reply email 175 is received that is sent to a tokenized email address that is associated with an expired token 141, the email processing application 121 can also issue a rejection email. In another approach, the email processing application 121 can issue a rejection email to the sender if the status 145 of the contact 133 associated with the token 141 indicates that the token 141 is "deactivated." As an additional example, the email processing application 121 can issue a rejection email to the sender if the status 145 of the contact associated with the token 141 is "unresolved," or "open." In this scenario, the issue associated with the contact 133 may not yet be ripe for unsolicited emails from the customer, as no email 173 has yet been created and sent to the associated user 147 by the email processing application 121.

Accordingly, a rejection email can advise the user of an appropriate reason for rejection of the reply email 175 sent by the sender. For example, if the sender of a reply email 175 is not associated with the contact 133 corresponding to the extracted token 141, then the email processing application 121 can advise the sender via a rejection email that the user is not authorized to send email to the tokenized email address. As another example, if the reply email 175 is received from an email address 151 associated with the contact 133 but is also received after an expiry window associated with the corresponding token 141, the rejection email can advise the sender that the tokenized email address to which the reply email 175 was sent has passed. In this scenario, the email processing application 121 can advise the sender of alternative contact methods with which the user can contact an enterprise associated with the email processing application 121 to obtain customer service.

Additionally, in the event that the reply email 175 is associated with a "deactivated" token 141, the rejection email generated by the email processing application 121 can advise the sender that emails sent to the tokenized address are unauthorized and/or unsolicited. In this sense, emails sent to the tokenized email address are unsolicited when a contact 133 is in a deactivated status 145, and emails sent to the tokenized address are solicited when a reply email 175 is sent by an associated user 147 only after the email 173 is sent by the email processing application 121 and the token 141 is activated. As yet another example of filtering that can be performed by the email processing application 121 a maximum threshold number of reply emails 175 and/or inbound emails that can be sent to the tokenized email address can be specified to limit the ability of an attacker to flood the tokenized email address with a high volume of emails. If such a threshold has been exceeded, the email processing application 121 can generate a rejection email message to the sender that the tokenized email address has been disabled due to potential abuse.

Referring next to FIGS. 2A-2B, shown is an example of an email 173 that can be generated by the email processing application 121 according to various embodiments of the disclosure. In the depicted example, the email 173 is created in response to customer initiated contact with an enterprise associated with the email processing application 121. Accordingly, the issue tracking application 119 can generate a contact 133 that corresponds to the customer initiated contact as well as a corresponding unique token 141. Personnel associated with the enterprise can then resolve a related customer issue and cause the contact 133 to be marked as "resolved," or the token 141 activated. In some scenarios, the actual customer service issue related to the contact 133 may not yet be resolved, but an email can be sent to the customer advising the customer of the status of the customer's issue, in which case, the contact 133 can also be marked as "resolved" or the token 141 activated. Upon resolution of the contact 133 or activation of the associated token 141 the email processing application 121 generates an email 173 that includes resolution information that is automatically generated from an email form template or provided by personnel associated with the enterprise. The email 173 containing resolution information associated with the contact 133 can then be sent to one or more email addresses 151 of the associated user 147.

In this example, as is shown in FIGS. 2A-2B, the "from" address associated with the email differs from the "reply-to" address of the email 173. In other words, the "reply-to" address is a tokenized email address 203 where at least a portion of the address includes the token 141. In contrast, the "from" address of the email 173 does not include the token. In this way, the tokenized email address is obfuscated from the recipient of the email 173 to a degree, which can also serve to limit unauthorized email sent to the tokenized email address 203. In one embodiment, the "from" address of the email 175 can comprise a "local-part" that is any type of username or string, and the "local-part" of the tokenized email address 203 is the same username or string with the token 141 appended thereto. In other embodiments, the "local-part" of the tokenized email address 203 can comprise only the token 141 or the token 141 appended to or concatenated with any other string other than the username of the "from" address of the email 173. Additionally, in some embodiments, the "from" address of the email 173 can comprise an unmonitored email address and/or non-working email address.

Figure 3:
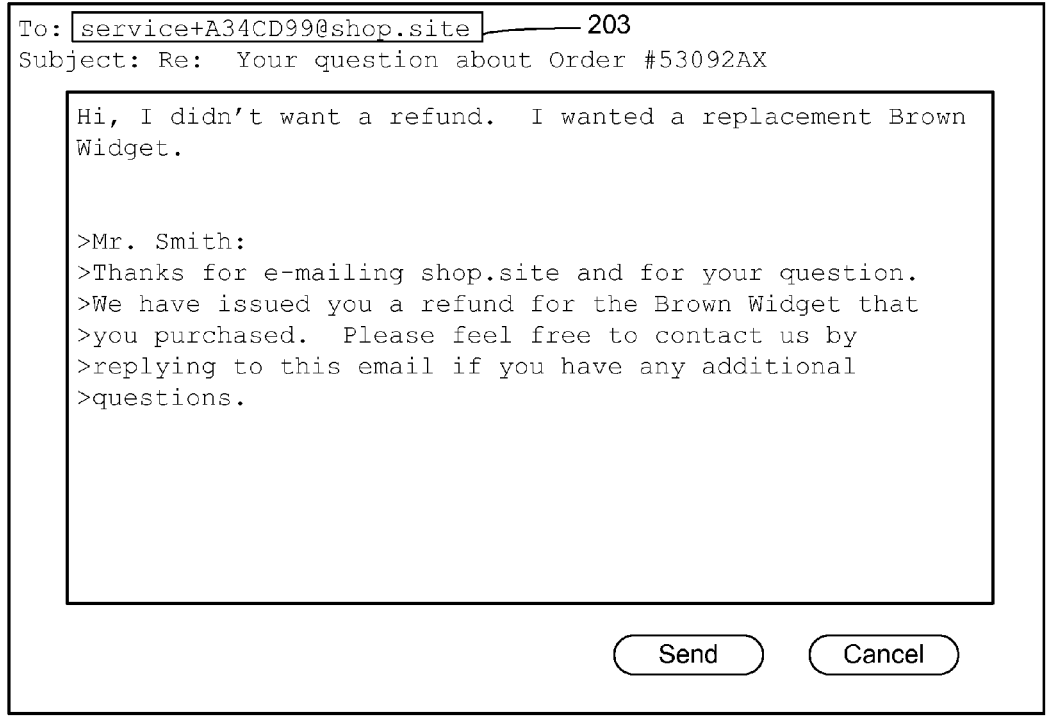
FIG. 3 is a drawing of an example reply email that can be processed by the email processing application executed by the computing device of FIG. 1 according to various embodiments of the present disclosure.

Reference is now made to FIG. 3, which illustrates a reply email 175 that results from a user replying to the email 173 sent by the email processing application 121. In the example shown in FIG. 3, because the "reply-to" address of the email 173 is designated by the email processing application 121 as a tokenized email address 203 corresponding to a unique token 141 that is in turn associated with the contact 133 from the data store 113, the "to" address of the reply email 175 becomes the tokenized email address 203. Therefore, the user can send the reply email 175 to the tokenized email address 203, and the recipient mail server can be configured to route the reply email 175 to the email processing application 121. By providing a framework with which the user can correspond with personnel associated with an enterprise via a reply email 175 the likelihood of contextual information contained in the exchanged emails (e.g., the content of the original email 173) is increased, thereby potentially facilitating faster resolution of the issue by enterprise personnel.

Therefore, in the example of FIG. 3, when the reply email 175 is obtained by the email processing application 121, the email processing application 121 can determine whether a valid token 141 can be extracted from the "to" address of the reply email 175. In this sense, a token 141 can be validated if there exists a contact 133 having a token 141 matching the one extracted from the reply email 175. If the reply email 175 contains a valid token 141, the email processing application 121 can then validate the sender of the reply email 175 by determining whether the sender (e.g., the email address associated with the "from" address of the reply email 175) matches an email address 151 of the associated user 147 of the contact 133. The email processing application can also validate whether the reply email 175 was sent by the sender and/or received by the email processing application 121 within an expiry window associated with the token 141. Additionally, the email processing application 121 can validate whether the contact 133 that corresponds to the extracted token 141 is associated with a token 141 that is in an "activated" status 145. As an alternative example, the email processing application 121 can validate whether the token 141 corresponds to a contact 133 that is associated with a status 145 corresponding to a "resolved" issue.

If any of the above validation steps fail, then, as noted above, the email processing application 121 can generate and send a rejection email that contains an error message to the sender (e.g., the "from" address of the reply email 175). If the email processing application 121 can validate the reply email 175, then the email processing application 121 can initiate post processing operations, which can include forwarding the reply email 175 to the appropriate personnel, changing an escalation status of the contact 133

Figure 4:
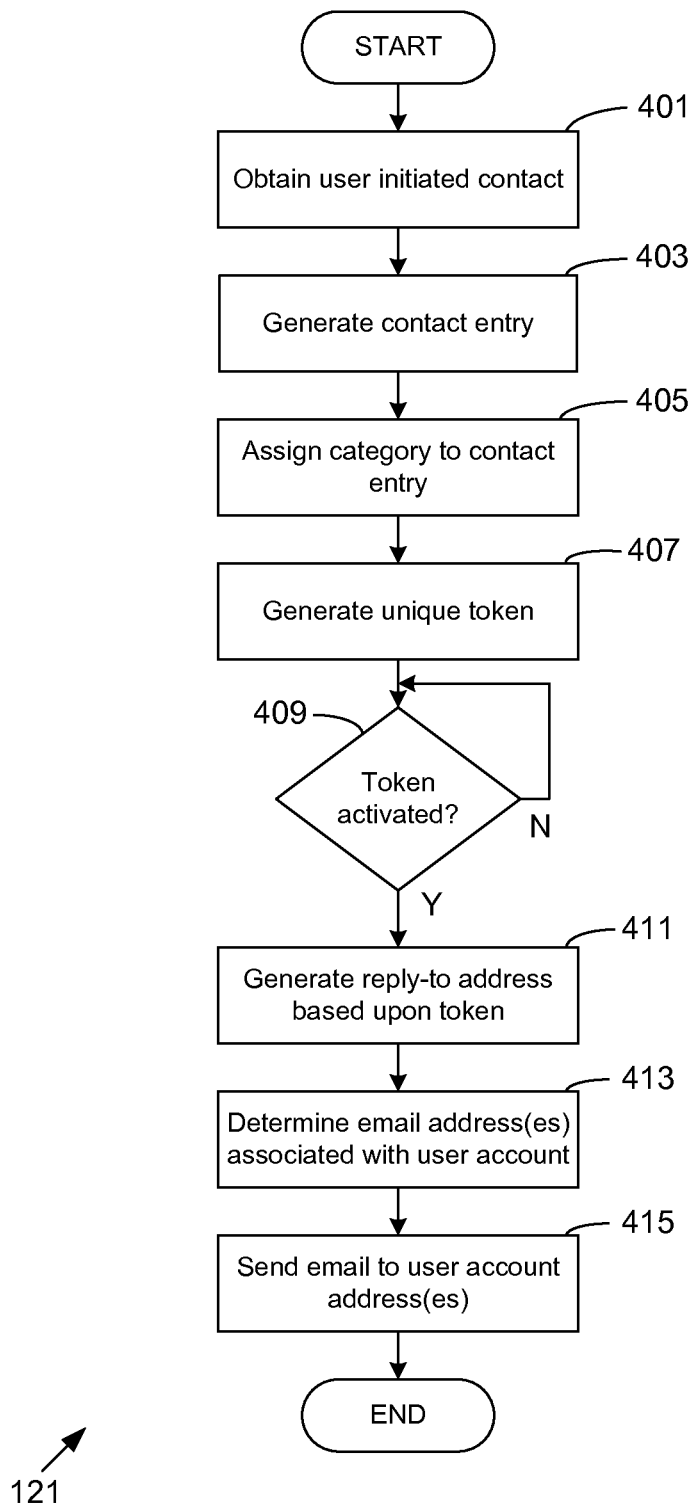
FIGS. 4-5 are flowcharts providing examples of the operation of the item tracking application of FIG. 1 according to an embodiment of the present disclosure.
Figure 5:
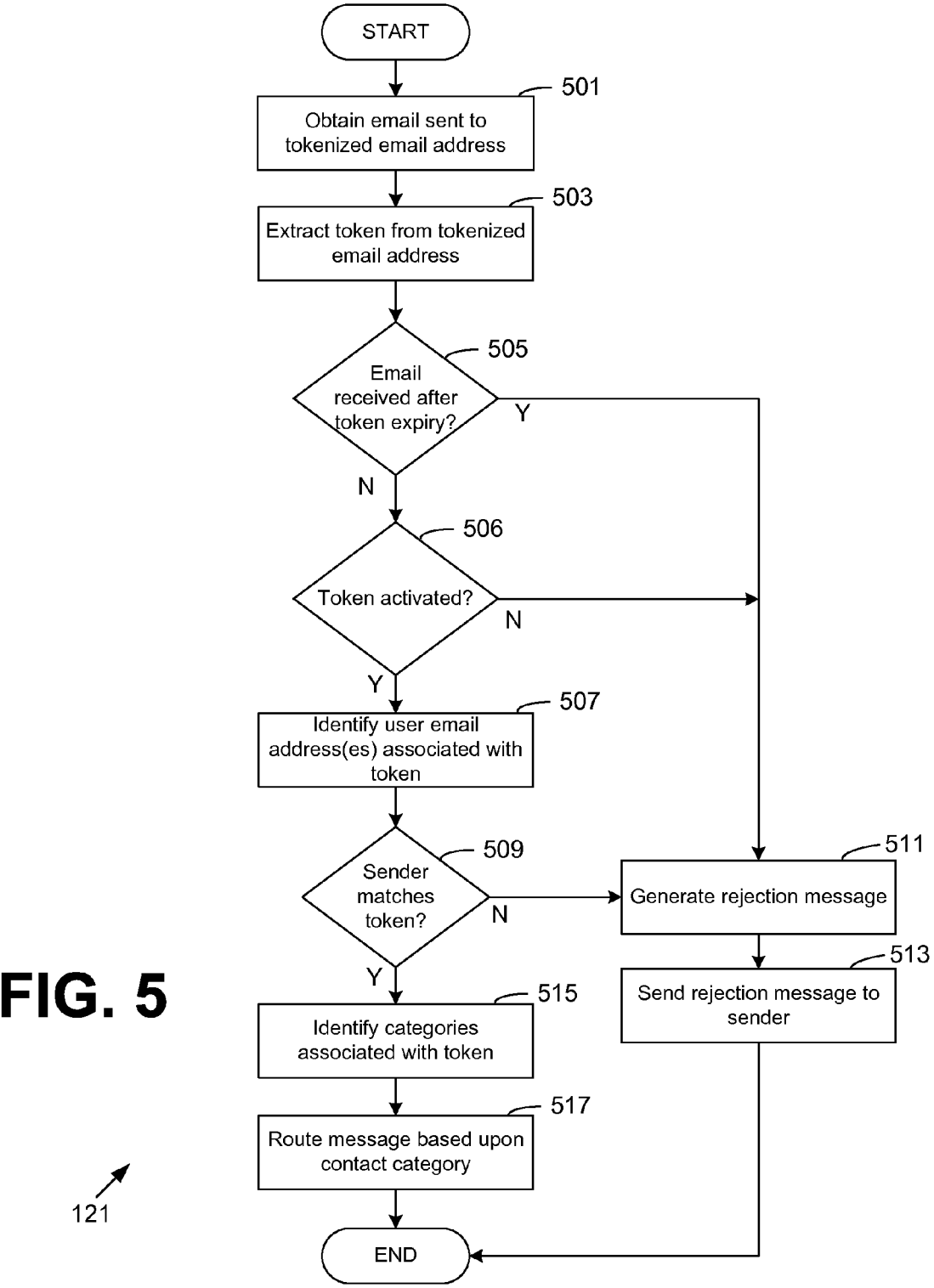

Referring next to FIGS. 4-5, shown is a flowchart that provides one example of the operation of a portion of the email processing application 121 according to various embodiments. It is understood that the flowcharts of FIGS. 4-5 provide merely examples of the many different types of functional arrangements that may be employed to implement the operation of the portion of the email processing application 121 as described herein. As an alternative, the flowcharts of FIGS. 4-5 may be viewed as depicting an example of steps of a method implemented in the computing device 103 (FIG. 1) according to one or more embodiments.

Beginning with box 401, the email processing application 121 can obtain information about a user initiated contact. As noted above, user initiated contact can comprise customer initiated contact with a customer service department of an enterprise for customer service, information, and/or resolution of any issue that a customer may have. The user initiated contact may comprise phone initiated contact with personnel of the enterprise, an email sent to a customer service email address, submission of a web based or other type of contact form, or any other methods of initiating contact that can be provided to customers.

In box 403, the email processing application 121 generates a contact 133 entry associated with the customer initiated contact in the data store 113. Based upon the context or subject matter of the customer initiated contact, the email processing application 121 and/or issue tracking application 119 can assign an issue category 143 to the contact 133 entry in box 405. The issue category 143 can be assigned based upon context of the user initiated communication and/or a selection of a category by the customer and/or customer service personnel. In box 407, the email processing application 121 generates a token 141 that can be incorporated into an email 173 that is sent to a user regarding resolution of an issue related to the contact 133 entry. As noted above, the token 141 can be a unique alphanumeric identifier that can be used as at least a portion of an email address that is specified as a "reply-to" and/or "from" address associated with the email 173. In some embodiments, the token 141 can comprise the entire email address that is associated with the email 173 rather than just a subpart of the email address.

In box 411, the email processing application can activate the token 141 corresponding to the contact 133 entry. In other words, when the email processing application 121 generates an email 173 that is sent to a customer corresponding to a contact 133, whether the email 173 is an automatically generated response or a response that is written by personnel responded to the contact 133 made by the customer, the corresponding token 141 is activated such a tokenized email address incorporating the token 141 is also activated. In some embodiments, when the issue associated with the contact 133 entry is changed to a resolved status 145 by enterprise personnel, the email processing application 121 generates a tokenized email address that incorporates the token 141, which also corresponds to activation of the token 141. In box 413, the email processing application 121 identifies one or more email addresses 151 that correspond to the associated user 147 of the resolved contact 133 entry. In box 415, the email processing application 121 sends an email to the identified one or more email addresses 151, where the body of the email can be automatically generated based upon the issue category 143 associated with the contact 133 and/or provided by enterprise personnel. In any case, the email contains resolution information that is related to the contact 133.

Referring next to FIG. 5, shown is an example of how the email processing application 121 can process and validate an inbound reply email 175. In box 501, the email processing application obtains a reply email 175 that is sent to a tokenized email address. In box 503, the email processing application 121 extracts the token 141 from the tokenized email address. In box 505, the email processing application 121 determines whether the token 141 extracted from the tokenized email address is an expired token. In other words, the email processing application 121 determines whether the reply email 175 was received within an expiry window associated with the token 141. If so, then the email processing application 121 can generate a rejection email message in box 511 and send the rejection email message to the sender in box 513. In this scenario, the rejection email message can advise the sender that the token 141 and/or tokenized email address has expired and advise the sender of alternative ways to contact a customer service department associated with the enterprise or any other error message as can be appreciated.

In box 506, the email processing application 121 determines whether the status 145 associated with the contact 133 corresponding to the token 141 is in an "activated" and/or "resolved" state. In other words, the email processing application 121 determines whether the token 141 has been activated. If not, then the tokenized email address can be deemed inactive, as the issue associated with the contact 133 may not yet be ripe for customer inquiries. In this sense, the tokenized email address associated with the token 141 can be activated only when an email 173 is first sent to a customer associated with the contact 133. If the status 145 associated with the token 141 is in a deactivated and/or an unresolved state, then the email processing application 121 generates a rejection email message in box 511 and sends the rejection email message to the sender of the reply email 175 in box 513 that contains an error message.

In box 507, the email processing application 121 identifies one or more email addresses 151 corresponding to the associated user 147 associated with the contact entry 133 corresponding to the extracted token 141. If, in box 509, the email processing application 121 determines that the sender of the reply email 175 fails to match the email addresses 151 of the associated user 147, the email processing application can generate a rejection email message in box 511 and send the rejection email message to the sender of the reply email 175 in box 513. In this scenario, the rejection email message can advise the sender that the sender is not an authorized user of the tokenized email address or any other error message.

If the reply email 175 is validated according to the above determinations, then the email processing application 121 proceeds to box 515, where one or more issue categories 143 are identified that correspond to the token 141 and/or associated contact 133 entry. In box 517, the email processing application 121 performs routing, escalation, or takes any other action based upon the issue categories 143 associated with the reply email 175. In some embodiments, the email processing application 121 can perform escalation depending on a number of reply emails 175 that have been received that correspond to a particular token 141. For example, if a user has exchanged multiple emails with a customer service department that are associated with a particular tokenized email address, this might be a measure of increasing customer dissatisfaction, and the email processing application 121 can escalate the issue associated with the contact 133 entry to different personnel based upon the number of emails received from an authorized user of the tokenized email address.

Figure 6:
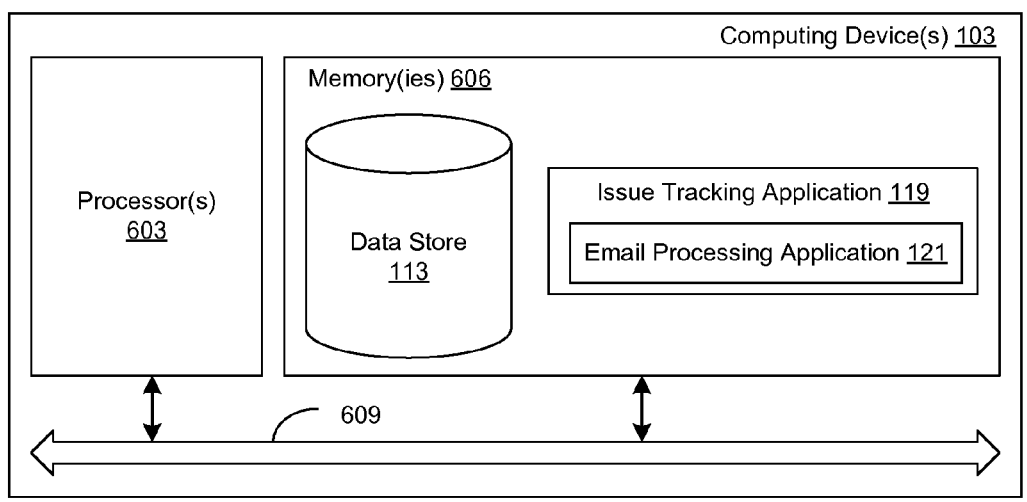
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the issue tracking application 119, email processing application 121, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the email processing application 121, issue tracking application 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the issue tracking application 119 and/or email processing application 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one first computing device, wherein, when executed, the at least one program causes the at least one first computing device to at least:
generate a contact entry in a data store, the contact entry associated with a user initiation of communication with an enterprise, the contact entry further associated with an issue to be resolved;
associate the contact entry with an issue category based at least in part upon the issue associated with the contact entry;
generate a token associated with the contact entry in response to associating the contact entry with the issue category, the token being a unique identifier;
generate an email associated with the contact entry, the email associated with a tokenized email address incorporating at least a portion of the token, the email associated with a resolution state of the issue associated with the contact entry;
designate a username as a portion of a local-part of the tokenized email address, the at least a portion of the token being appended to the username, the username associated with an original email address of the enterprise;
designate a "reply-to" address of the email as the tokenized email address;
designate a "from" address of the email as the original email address associated with the username;
send the email to at least one user email address associated with an account of a user associated with the contact entry;
obtain a reply email that is sent to the tokenized email address from a sender;
determine that the sender of the reply email corresponds to the user by determining that a "from" address of the reply email matches the at least one user email address;
determine that the reply email is received within an expiry window associated with the tokenized email address, the expiry window comprising a window of time outside of which the tokenized email address is expired; and
determine that the token is in an activated state in response to determining that the reply email is received within the expiry window.

2. A system comprising:
an electronic data store configured to store at least specific computer-executable instructions; and
a computing device comprising a hardware processor and in communication with the electronic data store, the computing device configured to execute the at least specific computer-executable instructions to at least:
generate a contact entry in the electronic data store, the contact entry further associated with a user initiation of communication with an enterprise, the contact entry further associated with an issue to be resolved;
associate the contact entry with an issue category based at least in part upon the issue associated with the contact entry;
generate an email token associated with the contact entry in response to associating the contact entry with the issue category, the email token being a unique identifier with respect to a plurality of identifiers associated with a plurality of email tokens in the electronic data store;
generate an email associated with the contact entry, the email associated with a tokenized email address incorporating at least a portion of the email token, the email comprising a message advising that the issue is still being resolved;
designate a username as a portion of a local-part of the tokenized email address, the at least a portion of the email token being appended to the username, the username associated with an original email address of the enterprise;
designate a "reply-to" address of the email as the tokenized email address;
designate a "from" address of the email as the original email address;
send the email to at least one user email address associated with a user account of a user associated with the contact entry;
obtain a received email sent to the tokenized email address;
identify the "from" address of the received email;
identify the email token in the tokenized email address;
identify the user account associated with the email token;
determine that the "from" address of the received email corresponds to the at least one user email address associated with the user account;
determine that the email token is associated with a "to" address of the received email;

identify the issue category associated with the email token; and forward the received email to another email address based at least in part upon the issue category associated with the email token.

3. The system of claim 2, wherein the computing device is further configured to at least:

determine that the "from" address of the received email differs from the at least one user email address; and reject the received email in response to determining that the "from" address differs from the at least one user email address.

4. The system of claim 2, wherein the computing device is further configured to at least:

generate an expiry window associated with the email, the expiry window being a period of time beginning when the email is sent to the at least one user email address;

determine that a received date of the received email is outside of the expiry window; and reject the received email in response to determining that the received date of the received email is outside of the expiry window.

5. The system of claim 2, wherein the computing device is further configured to at least determine that a status of the contact entry has changed.

6. The system of claim 2, wherein the computing device is further configured to execute specific computer-executable instructions to at least generate another email associated with the contact entry in response to determining that the issue has been resolved, the other email comprising another message advising that the issue has been resolved.

7. The system of claim 2, wherein the computing device is further configured to at least determine whether to escalate resolving the issue based at least in part on a number of reply communications received from the at least one user email address.

8. The system of claim 7, wherein the computing device is further configured to at least initiate escalation of the issue in response to a determination to escalate resolving the issue.

9. The system of claim 2, wherein the computing device is further configured to at least determine an escalation state of the issue in response to receipt of an email from the at least one user email address regarding the issue.

10. A computer-implemented method comprising:

generating, by a computing device, a contact entry associated with a user initiated communication with an enterprise and a user specified issue;

associating, by the computing device, the contact entry with an issue category based at least in part on the user specified issue;

generating, by the computing device, a unique token associated with the contact entry;

generating, by the computing device, a first email associated with the contact entry, the first email comprising:

a "reply-to" address, wherein a local part of the "reply-to" address comprises the unique token appended to a username, wherein the username is associated with an original email address of the enterprise; and a "from" address comprising the original email address;

sending, by the computing device, the first email to a destination address specified in the contact entry;

receiving, by the computing device, a second email;

determining, by the computing device, that a "to" address of the second email comprises the "reply-to" address included in the first email;

identifying, by the computing device, the unique token from the "to" address;

determining, by the computing device, that a sender of the second email corresponds to the destination address specified in the contact entry in response to identifying that at least one email address associated with the sender of the email corresponds to the unique token;

determining, by the computing device, that a status indicator associated with the contact entry indicates that the user specified issue associated with the contact entry is unresolved;

generating, by the computing device, a response email message comprising a message advising that the user specified issue is still being resolved; and transmitting, by the computing device, the response email message to the destination address.

11. The computer-implemented method of claim 10, further comprising:

determining, by the computing device, that the second email is received outside an expiry window;

generating, by the computing device, an expiration rejection email message comprising a message advising that the second email was received outside the expiry window; and transmitting, by the computing device, the expiration rejection email message to the destination address specified in the contact entry.

12. The computer-implemented method of claim 11, wherein the expiration rejection email message further comprises a message advising of at least one alternative method of contact.

13. The computer-implemented method of claim 10, further comprising:

validating, by the computing device, the status indicator associated with the contact entry corresponding to the unique token;

determining, by the computing device, that the status indicator is not equal to an expected value;

generating, by the computing device, a status rejection email message; and transmitting, by the computing device, the status rejection email message to the destination address.

14. The computer-implemented method of claim 13, wherein the status rejection email message comprises a message advising that a status is not equal to the expected value.

15. The computer-implemented method of claim 14, wherein the expected value of the status indicator comprises an activated state corresponding to the unique token.

16. The computer-implemented method of claim 10, further comprising:

determining, by the computing device, that a threshold specifying a maximum number of emails sent to the "reply-to" email address has been satisfied;

generating, by the computing device, a rejection email message in response to determining that the threshold specifying the maximum number of emails sent to the "reply-to" email address has been satisfied; and transmitting, by the computing device, the rejection email message to the destination address.

17. The computer-implemented method of claim 10, further comprising generating another email associated with the contact entry in response to determining that the user specified issue has been resolved, the other email comprising another message advising that the user specified issue has been resolved.

* * * * *